United States Patent [19]

McGee et al.

[11] Patent Number: 4,830,339
[45] Date of Patent: May 16, 1989

[54] POWER DRIVE FOR CABLE TIGHTENER

[76] Inventors: Danny C. McGee, Rte. 1, Box 9, Big Creek, Miss. 38914; Lenest W. Cavalier, Rte. 2, Box 1110, Plaquemine, La. 70764

[21] Appl. No.: 217,152
[22] Filed: Jul. 11, 1988
[51] Int. Cl.⁴ .......................... F16B 7/06; F16G 11/12
[52] U.S. Cl. .................................... 254/235; 254/236; 403/44
[58] Field of Search ............... 254/231, 232, 233, 234, 254/235, 236; 403/44, 45, 46; 24/232 R, 241 R, 241 P, 241 PS, 241 SL

[56] References Cited
U.S. PATENT DOCUMENTS

| | | | |
|---|---|---|---|
| 111,564 | 2/1871 | Patterson | 254/236 X |
| 1,318,408 | 10/1919 | Reddick | 254/235 |
| 2,822,199 | 2/1958 | Johnson | 254/234 X |
| 2,930,659 | 3/1960 | Willmore | 254/234 X |
| 3,105,675 | 10/1963 | Blackburn | 403/45 X |
| 3,803,926 | 4/1974 | Winter | 74/89.15 |
| 4,100,875 | 7/1978 | Patterson et al. | 403/44 X |
| 4,130,269 | 12/1978 | Schreyer | 403/45 X |
| 4,399,721 | 8/1983 | Jedlicka | 81/54 X |

Primary Examiner—Joseph J. Hail, III
Attorney, Agent, or Firm—Fleit, Jacobson, Cohn & Price

[57] ABSTRACT

A pair of laterally spaced, generally parallel opposite side members are provided and defined corresponding first and second ends. The first ends define aligned notches formed therein opening laterally outward of the side members in directions disposed generally normal to the longitudinal extent of the side members and the notched first side member ends may be hook-engaged over the longitudinal central portion of a turnbuckle assembly having an external gear wheel thereon, with the notched first ends of the side members embracingly receiving the gear wheel of the turnbuckle central portion therethrough. Longitudinal mid-portions of the side members journal a second gear wheel therebetween, and the second gear wheel is mesh engageable with the associated turnbuckle gear wheel. In addition, one axial lend of the second gear wheel projects through the corresponding side member and is equipped with an enlarged hexagonal head (or the equivalent) with which an impact wrench may be operatively engaged.

7 Claims, 2 Drawing Sheets

POWER DRIVE FOR CABLE TIGHTENER

BACKGROUND OF THE INVENTION

1. Field of the Invention

This invention relates to a removable power drive for the center rotatable portion of a turnbuckle structure utilized to tighten load binding and lashing cables.

2. Description of Related Art

Various different forms of power drives for turnbuckle structures heretofore have been provided, such as those disclosed in U.S. Pat. Nos. 2,822,199; 3,803,926; and 4,399,721. However, these previously known forms of turnbuckle drives do not include the overall combination of structural features of the instant invention.

SUMMARY OF THE INVENTION

Turn buckle assemblies are conventionally used for tightening load binding cables in various fields and also in the marine industry for tightening cables lashing barges together and barges to marine tugboats. Turn buckles used in the marine industry may have a maximum loading rating of approximately 91,000 lbs. and, accordingly, considerable manual effort and time must be expended in order to properly tighten marine lashing cables. Therefore, inasmuch as numerous lashing cables between a marine tugboat and an adjacent barge, as well as additional lashing cables between additional barges lashed together and to the first-mentioned barge, must be tightened, considerable manual effort and time may be saved through the utilization of a power drive for a cable tightener.

The main object of this invention is to provide a power drive for a cable tightener of the turnbuckle type.

Another object of this invention is to provide a power drive which may be readily operatively engaged with and disengaged from an associated cable tightener of the turnbuckle type.

Another important object of this invention is to provide a power drive for a cable tightener of the turnbuckle type having a manually operable and ratchet dog equipped actuating lever operatively associated therewith and with the power drive constructed in a manner to be engageable with the cable tightener independent of interference with the actuating lever.

A further object of this invention is to provide a power drive for a cable tightener of the turnbuckle type and wherein the power drive is constructed to be driven by an air powered or an electric powered impact wrench.

A final object of this invention to be specifically enumerated herein is to provide a power drive for a cable tightener in accordance with the preceding objects and which will conform to conventional forms of manufacture, be of simple construction, and easy to use so as to provide a device that will be economically feasible, long-lasting, and relatively trouble-free in operation.

These, together with other objects and advantages which will become subsequently apparent, reside in the details of construction and operation, as more fully hereinafter described and claimed, reference being had to the accompanying drawings forming a part hereof, wherein like numerals refer to like parts throughout.

DESCRIPTION OF THE PREFERRED EMBODIMENT

Figure 2:
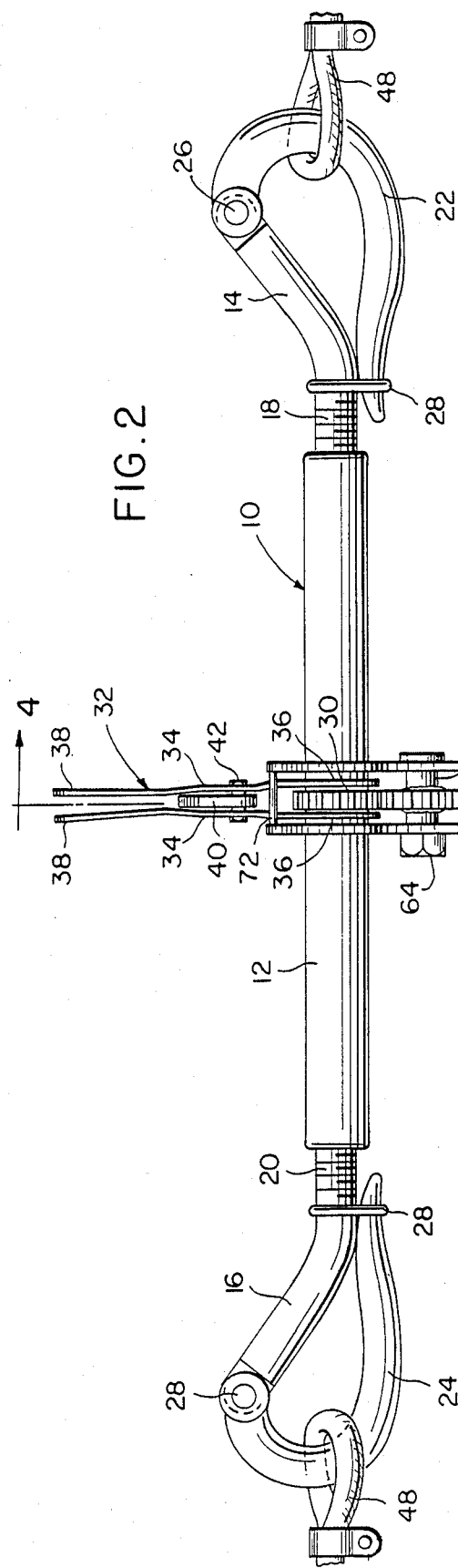
FIG. 2 is an enlarged top plan view of the assemblage illustrated in FIG. 1.

Referring now more specifically to the drawings, the numeral 10 generally designates a conventional form of cable tightener utilized in the marine industry to tighten lashing cables, but which may be used in other environments. The cable tightener 10 is in the form of a turnbuckle assembly including a central cylindrical sleeve member 12, whose opposite ends are oppositely internally threaded. The cable tightener 10 also includes a pair of opposite end hook members 14 and 16 having oppositely threaded shank portions 18 and 20 threadedly engaged in the opposite ends of the sleeve member 12. The hook members 14 and 16 include pivotally openable hook elements 22 and 24 pivotally supported therefrom as at 26 and 28, and each of the hook elements 22 and 24 may be releasably retained in the closed position thereof illustrated in FIG. 2 by an associated slip ring 28.

The longitudinal central portion of the sleeve member 12 supports an external square cut external gear wheel 30 and an elongated lever referred to in general by the reference numeral 32 and incorporating laterally spaced apart, elongated side plates 34. The side plates 34 include first and second corresponding ends 36 and 38. The ends 36 have openings therein through which the sleeve member 12 is snugly rotatably received closely adjacent and on opposite sides of the gear wheel 30. A reversible ratchet dog 40 is oscillatably supported between longitudinal mid-portions of the side plates 34 through the utilization of a pivot fastener 42, and the ends 38 of the side plates 34 define the handle end of the lever 32. The lever 32 and ratchet dog 40 may be used in conjunction with the gear wheel 30 during oscillation of the lever 32 about the sleeve member 12 to turn the sleeve member 12 in either direction relative to the hook members 14 and 16. Turning of the gear wheel 30 in a counterclockwise direction, as indicated by the arrow 44 in FIG. 4, functions to draw the shank portions 18 and 20 towards each other and to thus tighten the cable section ends 46 and 48.

The foregoing may be considered as a description of a conventional form of cable tightener.

The power drive of the instant invention is referred to in general by the reference numeral 50 and includes a pair of elongated, laterally spaced opposite side members 52 including corresponding first and second ends 54 and 56. The ends 54 define registered notches 58 formed therein which open outwardly of corresponding longitudinal marginal edges of the opposite side members 52. In addition, the opposite side members 52 include aligned bores 60 formed therethrough, and a sleeve 62 has its opposite ends rotatably received through the bore 60, one sleeve end including a non-circular (hexagonal) enlarged head 64 thereon disposed outwardly of the corresponding side member 52, and the other end of the sleeve 62 including an enlargement 66 thereon disposed outwardly of the corresponding side member 52. Of course, the head 64 and enlargement 66 serve to axially locate the sleeve 62 relative to the side members 52, the ends 56 of the side members 52 being rigidly interconnected by a transverse member 68.

Figure 1:
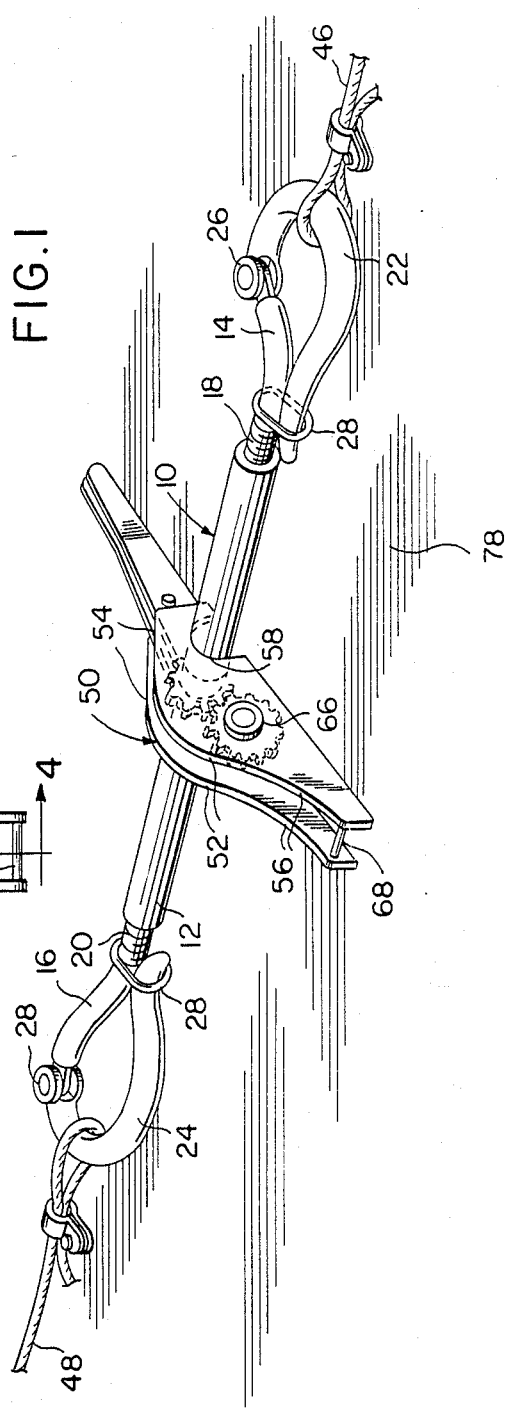
FIG. 1 is a perspective view of a conventional form of cable tightener having a power drive constructed in accordance with the present invention operatively associated therewith.
Figure 3:
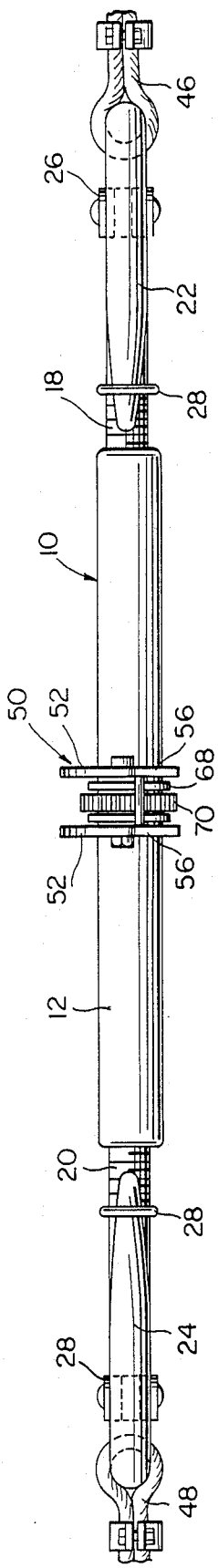
FIG. 3 is a side elevational view of the assemblage illustrated in FIGS. 1 and 2.
Figure 4:
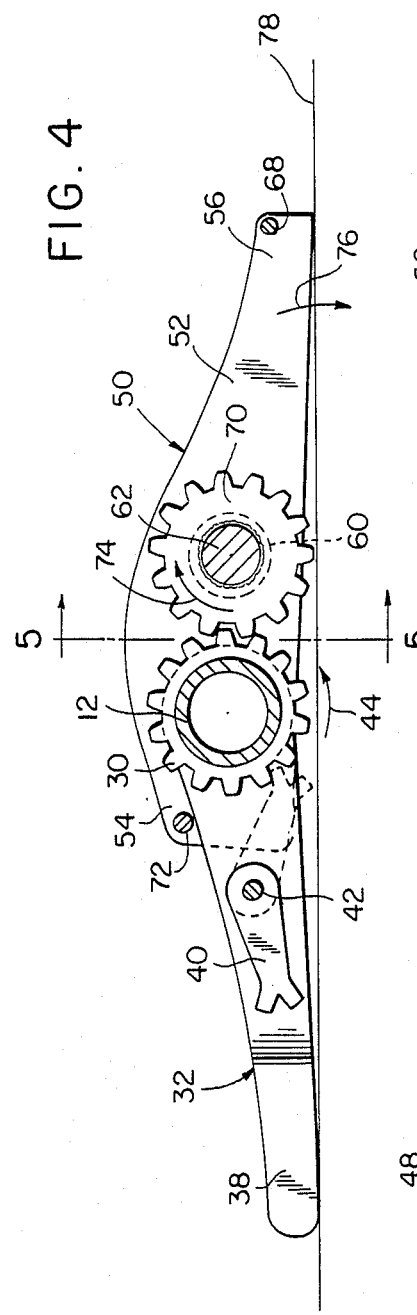
FIG. 4 is an enlarged transverse vertical sectional view taken substantially upon the plane indicated by the section line 4—4 of FIG. 2.
Figure 5:
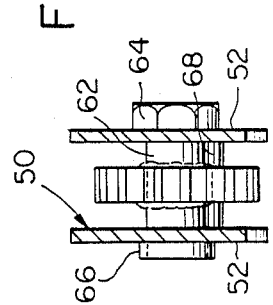
FIG. 5 is a vertical sectional view taken substantially upon the plane indicated by the section line 5—5 of FIG. 4.
Figure 6:
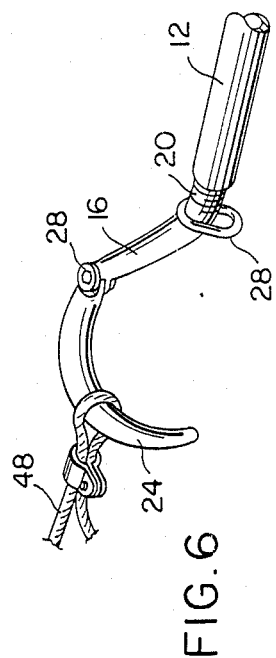
FIG. 6 is a fragmentary perspective view of the lefthand portion of the cable tightener illustrated in FIG. 2, with the hook portion thereof in the open position.

The notches 58 include semi-circular inner ends which snugly rotatably receive the sleeve member 12 therein when the power drive 50 is operatively associated with the cable tightener 10 in the manner illustrated in FIGS. 1, 2, and 4. The spacing between the first ends 54 of the opposite side members 52 is such that the first ends 36 of the side portions 34 are loosely, snugly received between the first ends 54, and it may be seen from FIGS. 2 and 4 of the drawings that the longitudinal central portion of the sleeve 62 includes a square cut external gear wheel 70 thereon meshed with the gear wheel 30. Also, the first ends 54 of the opposite side members 52 are interconnected by a transverse member 72.

When the power drive 50 is engaged with the cable tightener 10 in the manner illustrated in FIGS. 1, 2, and 4 of the drawings with the gear wheel 70 meshed with the gear wheel 30 and the ratchet dog 40 to an out-of-the-way position, the head 64 may be engaged by an impact wrench (either electrical or air), and the impact wrench may be used to rotate the sleeve 62 and thus the sleeve member 12. Accordingly, cable tightening operations may be more quickly and effortlessly carried out, and the time saved in tightening one cable may be multiplied many times as a result of the use of the power drive 50 in tightening all of the cables used to bind a large number of barges together and to a marine tug. The total amount of time saved, therefore, can result in a considerable savings in time and expense insofar as the usage of a plurality of barges and a marine tug is concerned.

If the power drive is engaged with the cable tightener 10 in the manner illustrated in FIG. 4 and the sleeve 62 is turned in the direction indicated by the arrow 74, the sleeve member 12 will be rotated in the direction indicated by the arrow 44 to tighten the cables 46 and 48. Furthermore, the application of rotary torque to the sleeve 62 in the direction of the arrow 74 will result in the second ends 56 of the side members 52 being urged downwardly in the direction of the arrow 76 so that the power drive 50 will have the second ends 56 of the side members 52 biased downwardly against an associated deck 78. Further, the application of rotary torque to the sleeve 62 in the direction of the arrow 74 and the contact of the second ends 56 with the deck 78 will result in the first ends 54 being tightly downwardly displaced such that the sleeve member 12 will be maintained tightly seated in the notches 58. In addition, if it is desired to loosen the cables 46 and 48, the lever 32 is swung to the right side of the sleeve member 12 illustrated in FIG. 4, and the power drive 50 is engaged with the sleeve member 12 such that the gear wheel 74 is disposed to the left of the gear wheel 30.

By using an impact wrench to drive the sleeve 62, considerable torque may be applied to the sleeve member 12 in a substantially effortless manner. Also, by using the square cut gear wheels 30 and 70, regardless of the amount of torque input to the power drive 50, there is substantially no tendency for the power drive 50 to shift axially of the sleeve member 12.

The foregoing is considered as illustrative only of the principles of the invention. Further, since numerous modifications and changes will readily occur to those skilled in the art, it is not desired to limit the invention to the exact construction and operation shown and described; and, accordingly, all suitable modifications and equivalents may be resorted to, falling within the scope of the invention.

We claim:

1. In combination with an elongated cable tightener of the type including opposite end cable anchor structures and a central elongated torque input member relative to whose opposite ends the corresponding cable anchor structures are oppositely threadedly engaged and wherein a longitudinal central portion of said torque input member includes a first external gear wheel mounted thereon, an elongated lever including a first end journalled on said longitudinal central portion adjacent said gear wheel and a second free swingable and handle-defining end extending outward from said longitudinal central portion, and ratchet dog means carried by said lever intermediate said first and second ends thereof operably engageable with said gear wheel, a power drive for said tightener, said power drive including a pair of elongated, laterally spaced opposite side members including pairs of corresponding first and second ends, said first ends defining aligned notches formed therein opening laterally outward of said side members in directions disposed generally normal to the longitudinal extent of said side members and in which portions of said torque input member spaced therealong in opposite directions from said gear wheel are removably rotatably receivable with said side members disposed generally normal to said torque input member, an elongated drive member extending between and journalled from said side members and including a second gear wheel thereon meshed with said first gear wheel, one end of said drive member including rotary torque input means adapted to have a powered rotary torque member removably drivingly connected thereto.

2. The combination of claim 1, wherein said rotary torque input means comprises a hexagonal head on said one end of said drive member.

3. The combination of claim 1, wherein said lever includes a pair of laterally spaced lever arms including pairs of first and second opposite ends at said first and free ends of said lever, said first pair of ends having aligned openings formed therethrough and being journalled on said central elongated torque input member on opposite sides of the first-mentioned external gear wheel.

4. The combination of claim 3, wherein said first ends of said opposite side members embracingly receive said first pair of ends of said lever arms therebetween.

5. The combination of claim 1, wherein said gear wheels include square cut teeth.

6. The combination of claim 5, wherein said lever includes a pair of laterally spaced lever arms including pairs of first and second opposite ends at said first and free ends of said lever, said first pair of ends having aligned openings formed therethrough and being journalled on said central elongated torque input member on opposite sides of the first-mentioned external gear wheel.

7. The combination of claim 6, wherein said first ends of said opposite side members embracingly receive said first pair of ends of said lever arms therebetween.

* * * * *